(12) United States Patent
Lambert

(10) Patent No.: US 11,560,905 B2
(45) Date of Patent: Jan. 24, 2023

(54) MULTISTAGE ASPIRATOR FOR INFLATABLE ASSEMBLIES

(71) Applicant: GOODRICH CORPORATION, Charlotte, NC (US)

(72) Inventor: Jerry A. Lambert, Dixon, CT (US)

(73) Assignee: Goodrich Corporation, Charlotte, NC (US)

( * ) Notice: Subject to any disclaimer, the term of this patent is extended or adjusted under 35 U.S.C. 154(b) by 307 days.

(21) Appl. No.: 16/714,009

(22) Filed: Dec. 13, 2019

(65) Prior Publication Data

US 2021/0180616 A1 Jun. 17, 2021

(51) Int. Cl.
| | |
|---|---|
| F04F 5/20 | (2006.01) |
| B64D 25/14 | (2006.01) |
| F04F 5/46 | (2006.01) |
| F04F 5/22 | (2006.01) |
| F04F 5/54 | (2006.01) |
| F04F 5/16 | (2006.01) |

(52) U.S. Cl.
CPC ............... *F04F 5/20* (2013.01); *B64D 25/14* (2013.01); *F04F 5/16* (2013.01); *F04F 5/22* (2013.01); *F04F 5/467* (2013.01); *F04F 5/54* (2013.01)

(58) Field of Classification Search
CPC ........ F04F 5/20; F04F 5/22; F04F 5/54; F04F 5/467; F04F 5/16; B64D 25/14
USPC .................................. 417/163, 170, 174, 184
See application file for complete search history.

(56) References Cited

U.S. PATENT DOCUMENTS

| | | | | |
|---|---|---|---|---|
| 2,306,727 A | * | 12/1942 | Hill ......................... | F24F 13/26 417/174 |
| 2,378,425 A | * | 6/1945 | Murray .................... | F04F 5/467 417/174 |
| 2,772,829 A | | 12/1956 | Crawford et al. | |
| 3,371,618 A | * | 3/1968 | Chambers ................ | F04F 5/467 417/174 |
| 3,460,747 A | * | 8/1969 | Forsythe .................. | F04F 5/466 417/189 |
| 3,598,504 A | | 8/1971 | Siravo | |
| 3,961,806 A | | 6/1976 | Katter | |
| 4,048,798 A | * | 9/1977 | Larkins, Jr. .............. | F02C 6/006 417/174 |
| 4,368,009 A | | 1/1983 | Heimovics, Jr. et al. | |
| 5,173,030 A | * | 12/1992 | Heimhard ................ | F04F 5/467 417/163 |
| 5,509,686 A | | 4/1996 | Shepherd et al. | |
| 5,820,160 A | | 10/1998 | Johnson et al. | |
| 6,071,084 A | | 6/2000 | Wass | |

(Continued)

FOREIGN PATENT DOCUMENTS

EP 467594 1/1992

*Primary Examiner* — Christopher S Bobish
(74) *Attorney, Agent, or Firm* — Snell & Wilmer L.L.P.

(57) ABSTRACT

A multistage aspirator for an inflatable assembly may comprise a first end defining a primary gas inlet and a second end defining a gas outlet. An internal surface of the multistage aspirator may define a flow path extending from the primary gas inlet to the gas outlet. A first stage of the multistage aspirator may include a first stage orifice extending from the internal surface to an external surface of the multistage aspirator. A second stage of the multistage aspirator may include a second stage orifice located downstream of the first stage orifice and extending from the external surface to the internal surface.

19 Claims, 4 Drawing Sheets

(56) References Cited

U.S. PATENT DOCUMENTS

| | | | |
|---|---|---|---|
| 6,582,199 B1 * | 6/2003 | Volkmann | F04F 5/52 |
| | | | 417/198 |
| 6,877,698 B2 | 4/2005 | Baker et al. | |
| 8,066,493 B2 | 11/2011 | Renz et al. | |
| 10,167,087 B2 | 1/2019 | Volny et al. | |
| 2004/0169599 A1 * | 9/2004 | Mathiasson | H01Q 17/00 |
| | | | 342/1 |
| 2006/0186654 A1 * | 8/2006 | Yamazaki | C06D 5/06 |
| | | | 280/741 |
| 2009/0155668 A1 * | 6/2009 | Ban | H01M 8/04097 |
| | | | 429/411 |
| 2018/0202466 A1 | 7/2018 | Haynes et al. | |
| 2019/0010962 A1 | 1/2019 | White | |
| 2020/0031439 A1 * | 1/2020 | Kruts | B63C 9/22 |

* cited by examiner

MULTISTAGE ASPIRATOR FOR INFLATABLE ASSEMBLIES

FIELD

The present disclosure relates to inflatable assemblies and, in particular, to multistage aspirators for inflatable assemblies.

BACKGROUND

Emergency evacuation assemblies generally include an inflatable structure, such an evacuation slide or a life raft, which may be used to exit an aircraft absent a jet way and/or in the event of a water landing. The gas used to inflate the inflatable structure is typically supplied by a cylinder containing compressed gas (such as nitrogen) or cryogenic fluid (such as liquid carbon dioxide). The volume of the gas supplied to the inflatable may be multiplied by injecting the supplied gas into an aspirator, which draws in ambient air that is combined with the supplied gas to inflate the inflatable structure. The aspirator may employ the venturi and/or coanda effect to use the flow of supplied gas to create a low pressure region in the flow stream, which draws in ambient air. Gas supplies that employ solid gas generators, as opposed to compressed gases, tend to reduce a weight and/or envelope of the evacuation assembly. However, the temperature of gases produced by solid gas generators may be 1000° Fahrenheit (F) (538° Celsius (C)) or greater. If the temperature of the gases entering the inflatable structure is too high, the material of the inflatable may melt and/or the inflatable may lose pressure when the temperature of the gas within the inflatable decreases. Additionally, the exhaust products of solid gas generators may contain flammable or other harmful gases. For example, solid gas generators that incorporate guanidine compounds to reduce the temperature of the exhaust gases can produce exhaust with greater than 14% hydrogen ($H_2$) gas.

SUMMARY

A multistage aspirator for an inflatable assembly is disclosed herein. In accordance with various embodiments the multistage aspirator may comprise a first end defining a primary gas inlet, a second end defining a gas outlet, an internal surface defining a flow path extending from the primary gas inlet to the gas outlet, and an external surface opposite the internal surface. A first stage may include a first stage orifice extending from the external surface to the internal surface. A second stage may include a second stage orifice located downstream of the first stage orifice and extending from the external surface to the internal surface.

In various embodiments, in the first stage of the multistage aspirator, an internal diameter of the multistage aspirator may increase from a first internal diameter to a second internal diameter greater than the first internal diameter.

In various embodiments, in the second stage of the multistage aspirator, the internal diameter of the multistage aspirator may increase from the second internal diameter to a third internal diameter greater than the second internal diameter.

In various embodiments, a third stage may include a third stage orifice located downstream of the second stage orifice. The third stage orifice may extend from the external surface to the internal surface. In various embodiments, a diameter of the external surface in the third stage may be greater than a diameter of the external surface in the second stage.

In various embodiments, a fourth stage may include a fourth stage orifice located downstream of the third stage orifice. The fourth stage orifice may extend from the external surface to the internal surface.

In various embodiments, in the third stage, the internal diameter of the multistage aspirator may increase from the third internal diameter to a fourth internal diameter greater than the third internal diameter.

In various embodiments, in the fourth stage, the internal diameter of the multistage aspirator may increase from the fourth internal diameter to a fifth internal diameter greater than the fourth internal diameter.

An evacuation assembly is also disclosed herein. In accordance with various embodiments, the evacuation assembly may comprise an inflatable, a gas supply, and a multistage aspirator fluidly coupled between the inflatable and the gas supply. The multistage aspirator may include an internal surface defining a flow path through the multistage aspirator, an external surface opposite the internal surface, a first stage including a first stage orifice extending from the external surface to the internal surface, and a second stage including a second stage orifice located downstream of first stage orifice and extending from the external surface to the internal surface.

In various embodiments, the gas supply may include a solid gas generating material. In various embodiments, in the first stage of the multistage aspirator, an internal diameter of the multistage aspirator may increase from a first internal diameter to a second internal diameter greater than the first internal diameter.

In various embodiments, in the second stage of the multistage aspirator, the internal diameter of the multistage aspirator may increase from the second internal diameter to a third internal diameter greater than the second internal diameter.

In various embodiments, a portion of the internal surface may be parallel to a center axis of the multistage aspirator. The portion of the internal surface may be located in at least one of the first stage or the second stage.

In various embodiments, the multistage aspirator may further include a third stage including a third stage orifice located downstream of the second stage orifice, the third stage orifice may extend from the external surface to the internal surface.

In various embodiments, the multistage aspirator may further include a fourth stage including a fourth stage orifice located downstream of the third stage orifice, the fourth stage orifice may extend from the external surface to the internal surface.

In various embodiments, a diameter of the external surface in the second stage may be greater than a diameter of the external surface in the first stage.

An inflation system is also disclosed herein. In accordance with various embodiments, the inflation system may comprise a gas supply comprising a solid gas generating material, and a multistage aspirator fluidly coupled to the gas supply. The multistage aspirator may include an internal surface defining a flow path between a primary gas inlet and a gas outlet of the multistage aspirator, an external surface opposite the internal surface, a first stage including a first stage orifice extending from the external surface to the internal surface, and a second stage including a second stage orifice located downstream of first stage orifice and extending from the external surface to the internal surface.

In various embodiments, the multistage aspirator may further include a third stage including a third stage orifice located downstream of the second stage orifice, and a fourth stage including a fourth stage orifice located downstream of the third stage orifice. The third stage orifice may extend from the external surface to the internal surface. The fourth stage orifice may extend from the external surface to the internal surface.

In various embodiments, an internal diameter of the multistage aspirator may increase in the first stage, the second stage, the third stage, and the fourth stage. In various embodiments, a conduit may fluidly couple the gas supply to the multistage aspirator. The conduit may include a choke.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

In the context of the present disclosure, methods, systems, and articles may find particular use in connection with evacuation slides and life raft assemblies. However, various aspects of the disclosed embodiments may be adapted for performance in a variety of other inflatable assemblies. As such, numerous applications of the present disclosure may be realized.

Figure 1:
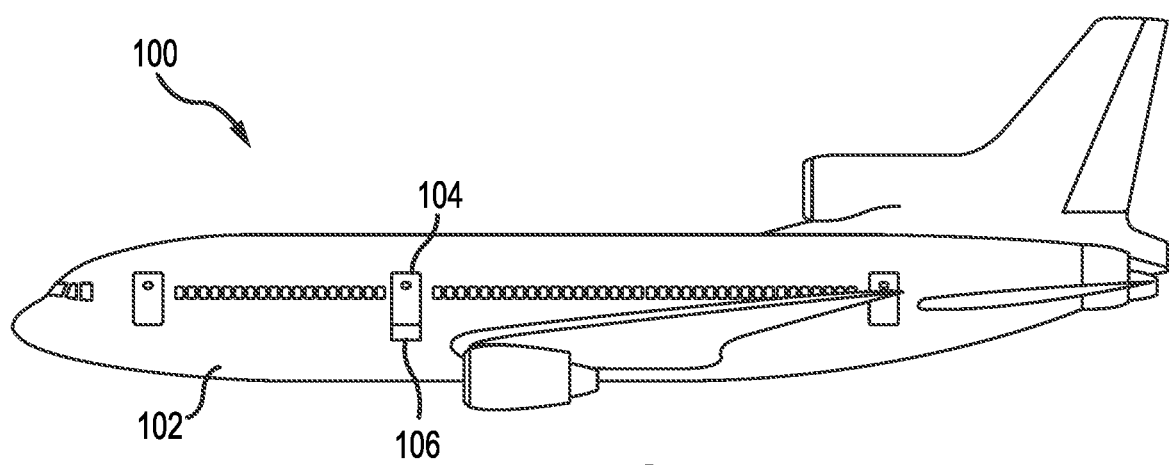
FIG. 1 illustrates an aircraft including an evacuation assembly, in accordance with various embodiments.

In accordance with various embodiments, and with reference to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation assembly 106 positioned near exit door 104. In the event of an emergency, exit door 104 may be opened by a passenger or crew member of aircraft 100. Evacuation assembly 106 may deploy in response to exit door 104 being opened and/or in response to an action taken by a passenger or crew member such as depression of a button or actuation of a lever. While evacuation assembly 106 is disclosed as deploying from exit door 104, it is further contemplated and understood that evacuation assembly 106 may deploy from other locations. For example, evacuation assembly 106 may deploy from a wing of aircraft 100.

Figure 2:
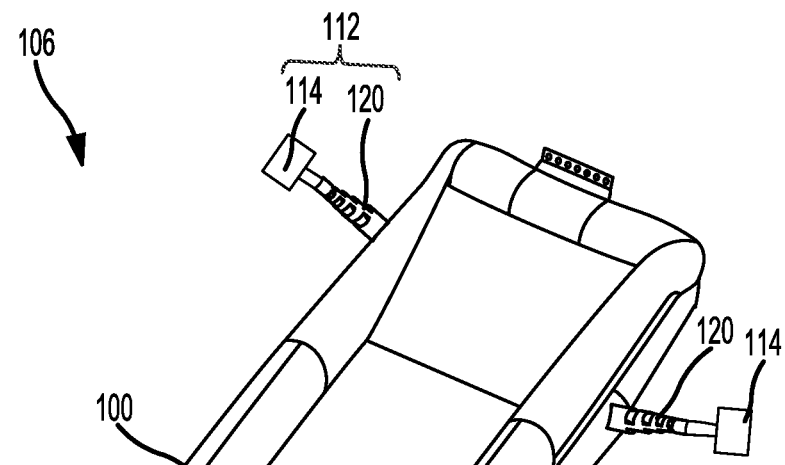
FIG. 2 illustrates an evacuation assembly including an inflatable structure in a deployed position, in accordance with various embodiments.

With reference to FIG. 2, evacuation assembly 106 is illustrated in a deployed position. In accordance with various embodiments, evacuation assembly 106 includes an inflatable 110. In various embodiments, inflatable 110 may be an evacuation slide. In various embodiments, inflatable 110 may be a life raft, a life vest, or any other inflatable structure. Inflatable 110 (referred to herein as evacuation slide 110) may be deployed from aircraft 100 in FIG. 1.

Evacuation assembly 106 may further include an inflation system 112. Inflation system 112 may include one or more gas supply(ies) 114 configured to inflate evacuation slide 110. Gas supply 114 is fluidly coupled to evacuation slide 110. In various embodiments, gas supply 114 may comprise a solid gas generating material. The solid gas generating material may be configured to provide a gas to evacuation slide 110 in response to a combustion and/or exothermic reaction of the solid gas generating material. For example, gas supply 114 may include sodium azide ($NaN_3$), ammonium perchlorate ($NH_4ClO_4$), perchloric acid ($HClO_4$), potassium perchlorate ($KClO_4$), sodium perchlorate ($NaClO_4$), sodium chlorate ($NaClO_3$), potassium chlorate ($KClO_3$), lithium chlorate ($LiClO_3$), and/or any suitable solid gas generating material. In various embodiments, gas supply 114 may comprise a charge tank including a compressed gas. In various embodiments, gas supply 114 may comprise a combination of compressed gas, cryogenic fluid, and solid gas generating material.

In accordance with various embodiments, inflation system 112 of evacuation assembly 106 further includes a multistage aspirator 120 fluidly coupled to gas supply 114. In accordance with various embodiments, multistage aspirator 120 may be fluidly coupled between gas supply 114 and evacuation slide 110. As discussed in further detail below, multistage aspirator 120 may be configured to entrain ambient air with gas output from gas supply 114 (referred to herein as primary gas). For example, in response to deployment of evacuation slide 110, primary gas from gas supply 114 may flow into multistage aspirator 120 at a relatively high velocity. This primary gas flow may cause multistage aspirator 120 to draw in a secondary gas (i.e., ambient air) from the environment. The primary gas flow and the environmental gas may be directed into evacuation slide 110. In response to receiving the primary gas and the environmental gas, evacuation slide 110 begins to inflate. While inflation system 112 is described as inflating evacuation slide 110, it is further contemplated and understood that inflation system 112 may be employed to inflate other inflatable structures such as life rafts, life vests, or any other desired inflatable.

Multistage aspirator 120 may include multiple stages, or orifices, where ambient air is drawn in to multistage aspirator 120. The orifices may be configured to produce a venturi effect and/or a coanda effect. In accordance with various embodiments, the orifices are arranged in a series, such that the output of one stage of the aspirator acts as the input flow of the next stage in the series. The orifices are arranged or "spaced" such that a combined flow of gas and ambient air from each orifice stabilizes before reaching the next orifice in the flow stream. In this regard, multistage aspirator 120 tends to draw in a greater volume of ambient air, as compared to single-stage aspirators. The increased amount of ambient air tends to increase inflation efficiency and may allow for smaller gas supplies, which tends to reduce a size and/or weight of evacuation assembly 106. In various embodiments, each stage of multistage aspirator 120 feeds into the subsequent, or "downstream" stage, thereby compounding the ambient air intake. The increased ambient air volume may dilute undesirable gas products and/or decrease a temperature of the primary gas. Multistage aspirator 120 may thus allow evacuation assembly 106 to employ solid gas generators for gas supply 114, without the including additional gas cooling means, such as stored cryogenic coolers.

While multistage aspirator 120 is described herein as aiding inflation of an evacuation slide, it is further contemplated and understood that multistage aspirator 120 may be employed to aid inflation of other inflatables structures. For example, in various embodiments, evacuation assembly 106 may include a life raft to which gas supply 114 and multistage aspirator 120 may be fluidly coupled.

Figure 3A:
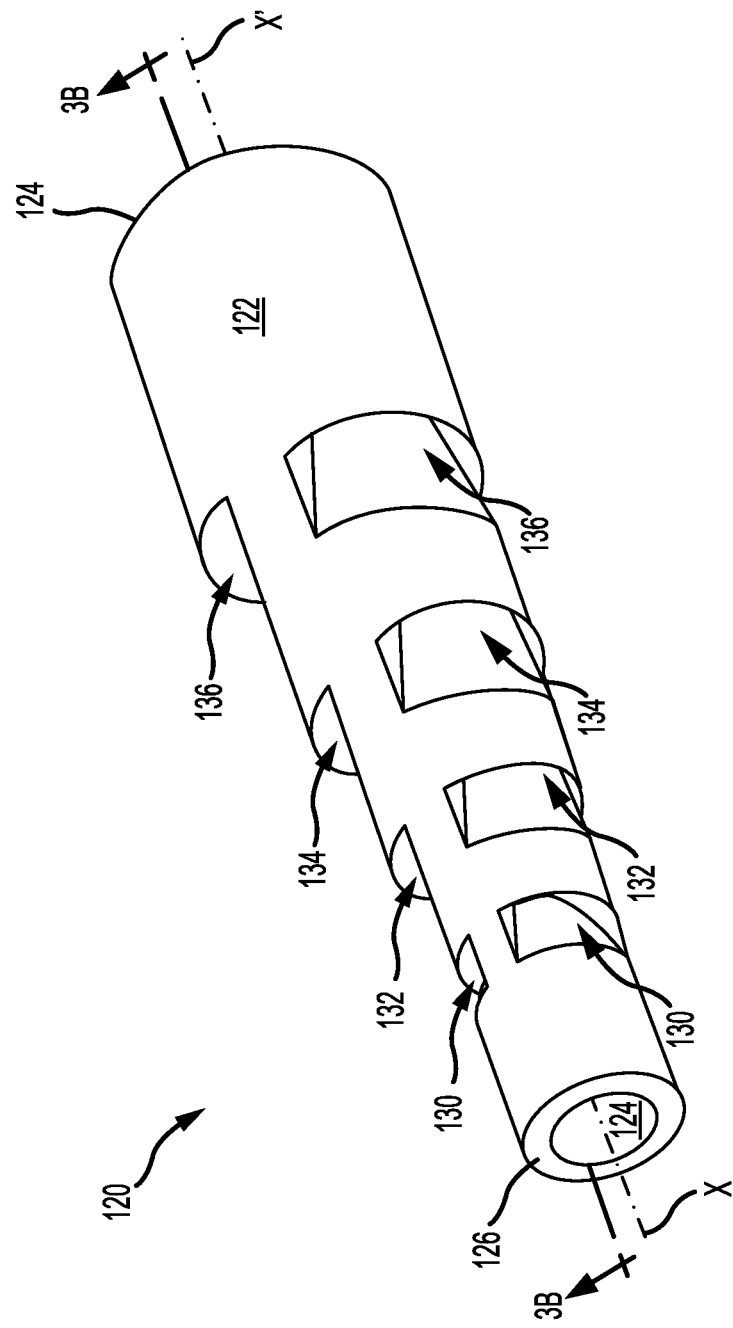
FIG. 3A illustrates a perspective view of a multistage aspirator, in accordance with various embodiments.

With reference to FIG. 3A, a perspective view of a multistage aspirator 120 is illustrated. In accordance with various embodiments, multistage aspirator 120 includes an external surface 122 and an internal surface 124. Internal surface 124 is oriented generally toward a center axis X-X' of multistage aspirator 120. External surface 122 is oriented generally away from center axis X-X'. Multistage aspirator 120 may comprise a generally cylindrical shape, with external surface 122 and internal surface 124 oriented about center axis X-X'. As used herein, the terms "axial" and "axially" refer to direction parallel to center axis X-X', the terms "radial" and "radially" refer to directions toward and away from center axis X-X', and the terms "circumferential" and "circumferentially" refer to directions about center axis X-X'.

Multistage aspirator 120 includes a first (or inlet) end defining a primary gas inlet 126, and a second (or outlet) end defining a gas outlet 128. Gas outlet 128 is located axially opposite primary gas inlet 126. When multistage aspirator 120 is in an installed state (i.e., fluidly coupled between a gas supply and an inflatable), primary gas inlet 126 is upstream of gas outlet 128. As used herein, a first component that is "upstream" of a second component means that first component receives the primary gas from gas supply 114, with momentary reference to FIG. 2, prior to the second component. As used herein, a first component that is "downstream" of a second component means that second component receives the primary gas from gas supply 114, with momentary reference to FIG. 2, after or subsequent to the second component.

Multistage aspirator 120 includes and defines one or more first stage orifice(s) 130 and one or more second stage orifice(s) 132 downstream of first stage orifice 130. In various embodiments, multistage aspirator 120 may include and define one or more third stage orifice(s) 134 downstream of second stage orifice 132, and/or one or more fourth stage orifice(s) 136 downstream of third stage orifice 134. Each of first stage orifice 130, second stage orifice 132, third stage orifices 134, and fourth stage orifice 136 is configured to entrain ambient air with gas flowing through multistage aspirator 120. In this regard, air located radially outward of external surface 122 may flow through first stage orifice 130, second stage orifice 132, third stage orifice 134, and fourth stage orifice 136 and mix with gas located radially inward of internal surface 124.

In accordance with various embodiments, an outer circumference of multistage aspirator 120 (i.e., a diameter multistage aspirator 120 as measured at external surface 122) may increase in the downstream direction, such that the outer circumference at fourth stage orifice 136 is greater than the outer circumference at third stage orifice 134, the outer circumference at third stage orifice 134 is greater than the outer circumference at second stage orifice 132, and the outer circumference at second stage orifice 132 is greater than the outer circumference at first stage orifice 130.

Figure 3B:
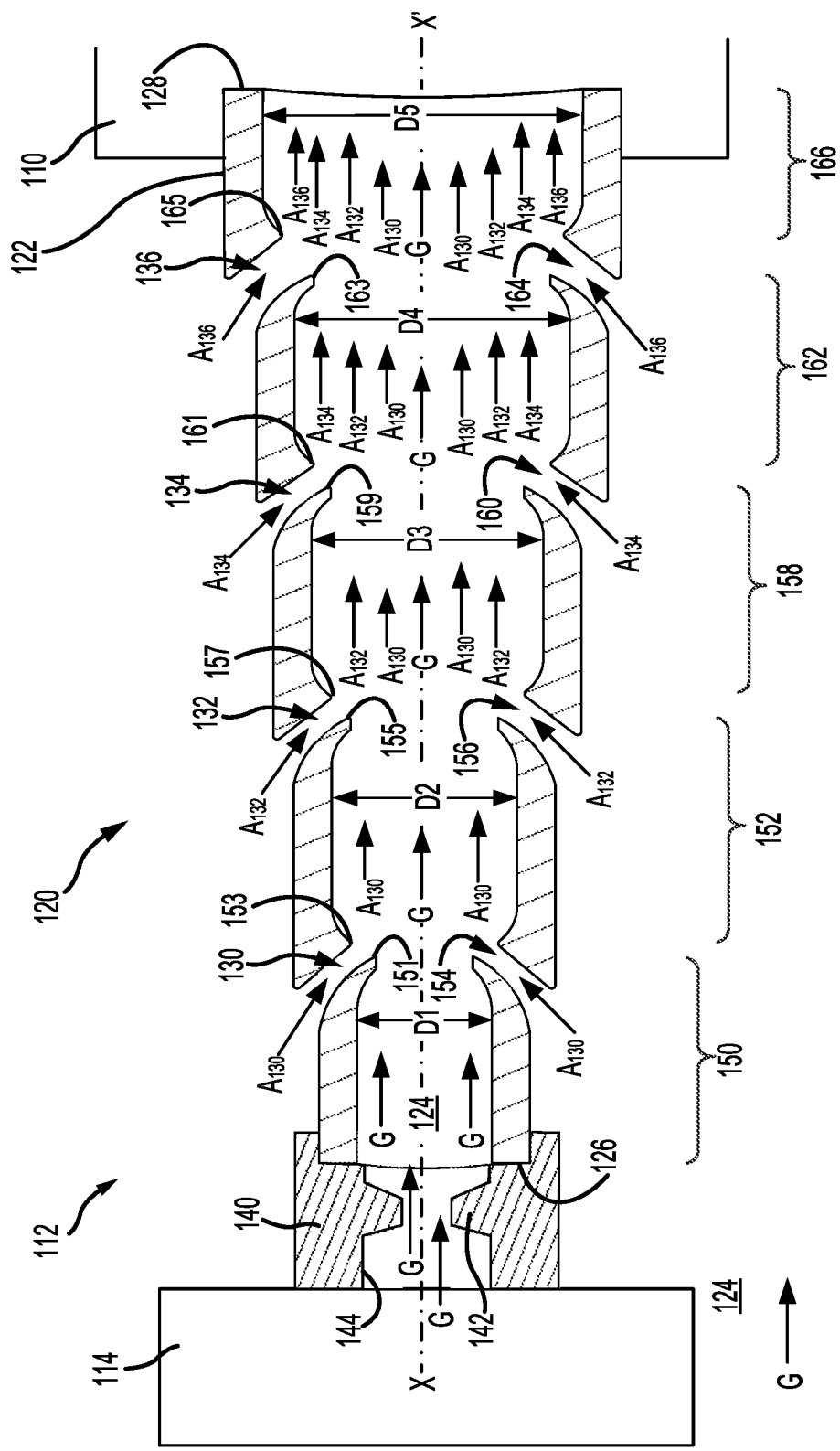
FIG. 3B illustrates a cross-section view of a multistage aspirator taken along the line 3B-3B in FIG. 3A, in accordance with various embodiments.

With reference to FIG. 3B, a cross-sectional view showing an internal surface 124 multistage aspirator 120 and a gas flow path through multistage aspirator 120 are illustrated. In accordance with various embodiments, the gas flow path through multistage aspirator 120 may be defined by internal surface 124. Gas outlet 128 of multistage aspirator 120 may be fluidly coupled to evacuation slide 110. Primary gas inlet 126 of multistage aspirator 120 may be fluidly coupled to gas supply 114. In various embodiments, a conduit 140 may be fluidly coupled between gas supply 114 and primary gas inlet 126. In various embodiments, conduit 140 may include a choke 142 extending radially inward from a radially inward surface 144 of conduit 140. Choke 142 may decrease an inner diameter of conduit 140. Choke 142 may be used to control the pressure of gas supply 114 and/or to control the flow rate of primary gas G into an inlet stage 150 and a first stage 152 of multistage aspirator 120.

In accordance with various embodiments, primary gas G may be output from gas supply 116, flow through conduit 140 and into multistage aspirator 120 at gas inlet 126. Upon entry into multistage aspirator 120, primary gas G flows through an inlet stage 150 of multistage aspirator 120. Inlet stage 150 extends along internal surface 124 from primary gas inlet 126 to an upstream edge 151 of the outlet 154 of first stage orifice 130 (i.e., to where ambient air $A_{130}$ exits first stage orifices 130). Inlet stage 150 comprises a diameter D1. Stated differently, multistage aspirator 120 has an internal of diameter D1 in inlet stage 150. In various embodiments, D1 may be equal throughout inlet stage 150, such that internal surface 124 is parallel to center axis X-X' in inlet stage 150. In various embodiments, diameter D1 may decrease proximate outlet 154 of first stage orifices 130. Stated differently, in inlet stage 150, internal surface 124 may include a first portion that parallel to center axis X-X' and a second portion that is non-parallel to center axis X-X'.

In accordance with various embodiments, primary gas G may flow from inlet stage 150 into first stage 152 of multistage aspirator 120. In first stage 152, primary gas G may mix with ambient air $A_{130}$ provided from first stage orifices 130. In accordance with various embodiments, first stage 152 extends along internal surface 124 from downstream edge 153 of outlet 154 to an upstream edge 155 of outlet 156 of second stage orifice 132 (i.e., to where ambient air $A_{132}$ exits second stage orifice 132). First stage 152 comprises a diameter D2, which is greater than the diameter D1 of inlet stage 150. Stated differently, the internal of diameter of multistage aspirator 120 increases from D1 to D2 in first stage 152. The increase in diameter in first stage 152 in combination with configuration of upstream edge 151 and downstream edge 153 of first stage orifices 130 tends to create a venturi effect, which draws ambient air $A_{130}$ through first stage orifices 130. While first stage orifices 130 and first stage 152 are illustrated as creating a venturi effect, it is further contemplated and understood that upstream edge 151 and downstream edge 153 of first stage orifices 130 may be configured to generate a coanda effect, and/or may be oriented in any manner sufficient to generate a region at first stage orifice 130 having a lower pressure than inlet stage 150 and thereby entrain ambient air $A_{130}$ through first stage orifice 130.

In various embodiments, diameter D2 may increase proximate downstream edge 153 of first stage orifices 130 and may decrease proximate outlet 156 of second stage orifices 132. Stated differently, in first stage 152, internal surface 124 may include a first portion proximate downstream edge 153 that is non-parallel to center axis X-X', a second portion proximate upstream edge 155 that is non-parallel to center axis X-X', and a third portion extending between the first portion and the second portion that is parallel to center axis X-X'.

In accordance with various embodiments, the mixture of primary gas G and ambient air $A_{130}$ may flow from first stage 152 into second stage 158 of multistage aspirator 120. In second stage 158, ambient air $A_{132}$ is added to (i.e., mixes with) the mixture of primary gas G and ambient air $A_{130}$ flowing from first stage 152. In this regard, ambient air $A_{132}$ further dilutes the gas in second stage 158, such that primary gas G and any undesirable components in primary gas G (e.g., $H_2$) form a smaller percentage of the gas mixture in second stage 158, as compared to first stage 152. Ambient air $A_{130}$, $A_{132}$ forming a larger percentage of the gas mixture in second stage 158 may also increase heat transfer and/or the conduction of heat from primary gas G to the ambient air.

In accordance with various embodiments, second stage 158 extends along internal surface 124 from downstream edge 157 of outlets 156 to an upstream edge 159 of outlets 160 of third stage orifices 134 (i.e., to where ambient air $A_{134}$ exits third stage orifices 134). Second stage 158 comprises a diameter D3, which is greater than the diameter D2 in first stage 152. Stated differently, the internal of diameter of multistage aspirator 120 increases from D2 to D3 in second stage 158. The increase in diameter in second stage 158 in combination with configuration of upstream edge 155 and downstream edge 157 of second stage orifices 132 tends to create a venturi effect, which draws ambient air $A_{132}$ through second stage orifices 132. While second stage orifices 132 and second stage 158 are illustrated as creating a venturi effect, it is further contemplated and understood that upstream edge 155 and downstream edge 157 of second stage orifices 132 may be configured to generate a coanda effect, and/or may be oriented in any manner sufficient to generate a region at second stage orifices 132 having a lower pressure than first stage 152 and thereby entrain ambient air $A_{132}$ through second stage orifices 132.

In various embodiments, diameter D3 may increase proximate downstream edge 157 of second stage orifices 132 and may decrease upstream edge 159 of third stage orifices 134. Stated differently, in second stage 158, internal surface 124 may include a first portion proximate downstream edge 157 that is non-parallel to center axis X-X', a second portion proximate upstream edge 159 that is non-parallel to center axis X-X', and a third portion extending between the first portion and the second portion that is parallel to center axis X-X'.

In accordance with various embodiments, the mixture of primary gas G and ambient air $A_{130}$, $A_{132}$ may flow from second stage 158 into a third stage 162 of multistage aspirator 120. In third stage 162, ambient air $A_{134}$ is added to (i.e., mixes with) the mixture of primary gas G and ambient air $A_{130}$, $A_{132}$ flowing from second stage 158. In this regard, ambient air $A_{134}$ further dilutes the gas in third stage 162, such that primary gas G and any undesirable components in primary gas G form a smaller percentage of the gas mixture in third stage 162, as compared to second stage 158 and first stage 152. Ambient air $A_{130}$, $A_{132}$, $A_{134}$ forming a larger percentage of the gas mixture in third stage 162 may also increase heat transfer and/or the conduction of heat from primary gas G, thereby further decreasing a temperature of the gas mixture in third stage 162.

In accordance with various embodiments, third stage 162 extends along internal surface 124 from the downstream edge 161 of outlets 160 of third stage orifices 34 to an upstream edge 163 of outlets 164 of fourth stage orifices 136 (i.e., to where ambient air $A_{136}$ exits fourth stage orifices 136). Third stage 162 comprises a diameter D4, which is greater than the diameter D3 in second stage 158. Stated differently, the internal of diameter of multistage aspirator 120 increases from D3 to D4 in third stage 162. The increase in diameter in third stage 162 in combination with configuration of upstream edge 159 and downstream edge 161 of third stage orifices 134 tends to create a venturi effect, which draws ambient air $A_{134}$ through third stage orifices 134. While third stage orifices 134 and third stage 162 are illustrated as creating a venturi effect, it is further contemplated and understood that upstream edge 159 and downstream edge 161 of third stage orifices 134 may be configured to generate a coanda effect, and/or may be oriented in any manner sufficient to generate a region at third stage orifices 134 having a lower pressure than second stage 148 and thereby entrain ambient air $A_{134}$ through third stage orifices 134.

In various embodiments, diameter D4 may increase proximate downstream edge 161 of third stage orifices 134 and may decrease proximate upstream edge 163 of fourth stage orifices 136. Stated differently, in third stage 162, internal surface 124 may include a first portion proximate downstream edge 161 that is non-parallel to center axis X-X', a second portion proximate upstream edge 163 that is non-parallel to center axis X-X', and a third portion extending between the first portion and the second portion that is parallel to center axis X-X'.

In accordance with various embodiments, the mixture of primary gas G and ambient air $A_{130}$, $A_{132}$, $A_{134}$ may flow from third stage 162 into a fourth stage 166 of multistage aspirator 120. In fourth stage 166, ambient air $A_{136}$ is added to (i.e., mixes with) the mixture of primary gas G and ambient air $A_{130}$, $A_{132}$, $A_{134}$ flowing from third stage 162. In this regard, ambient air $A_{136}$ further dilutes the gas in fourth stage 166, such that primary gas G and any undesirable components in primary gas G, form a smaller percentage of the gas mixture in fourth stage 166, as compared to third stage 162, second stage 158, and first stage 152. Ambient air $A_{130}, A_{132}, A_{134}, A_{136}$ forming a larger percentage of the gas mixture in fourth stage 166 may also increase heat transfer and the conduction of heat from primary gas G, thereby further decreasing a temperature of the gas mixture in fourth stage 166.

In accordance with various embodiments, fourth stage 166 extends along internal surface 124 from downstream edge 165 of outlets 164 of fourth stage orifices 136 to gas outlet 128 of multistage aspirator 120 (i.e., to where the mixture of primary gas G and ambient air $A_{130}, A_{132}, A_{134}, A_{136}$ exits multistage aspirator 120 and/or is input into evacuation slide 110). Fourth stage 166 comprises a diameter D5, which is greater than the diameter D4 in third stage 162. Stated differently, the internal of diameter of multistage aspirator 120 increases from D4 to D5 in fourth stage 166. The increase in diameter in fourth stage 166 in combination with configuration of upstream edge 163 and downstream edge 165 of further stage orifices 136 tends to create a venturi effect, which draws ambient air $A_{136}$ through fourth stage orifices 136. While fourth stage orifices 136 and fourth stage 166 are illustrated as creating a venturi effect, it is further contemplated and understood that upstream edge 163 and downstream edge 165 of further stage orifices 136 may be configured to generate a coanda effect, and/or may be oriented in any manner sufficient to generate a region at fourth stage orifices 136 having a lower pressure than third stage 162 and thereby entrain ambient air $A_{136}$ through fourth stage orifices 136.

In various embodiments, diameter D5 may increase proximate downstream edge 165 of fourth stage orifices 136. In various embodiments, in fourth stage 166, internal surface 124 may include a first portion proximate downstream edge 165 that is non-parallel to center axis X-X' and a second portion extending between the first portion and gas outlet 128 that is parallel to center axis X-X'.

Multistage aspirator 120 drawing in ambient air at multiple stages along the axial length of multistage aspirator 120 tends to increase inflation efficiency of evacuation slide 110. In various embodiments, each stage of multistage aspirator 120 feeding into the "downstream" stage (e.g., first stage 152 feeding into second stage 158, second stage 158 feeding into third stage 162, etc.) compounds the volume ambient air flowing through multistage aspirator 120, diluting undesirable products and/or decreasing a temperature of the gas mixture provided to evacuation slide 110.

In this regard, multistage aspirator 120 may be employed with solid gas generators, by virtue of multistage aspirator 120 diluting any undesirable gas products produced by the solid gas generator to harmless levels and diluting the heat of the gas output from solid gas generator so that the temperature may be tolerated by the inflatable device (e.g., by evacuation slide 110). In this regard, multistage aspirator 120 may reduce the cost, weight, volume, and/or complexity of the inflation system While multistage aspirator 120 is illustrated as having four stages with four stages of orifices, it is further contemplated and understood that multistage aspirator 120 may include any number of stages. For example, in various embodiments, multistage aspirator 120 may include fewer than four stages and in various embodiments, multistage aspirator 120 may include additional stages downstream of fourth stage 166. In this regard, in various embodiments, multistage aspirator 120 may include additional stages and/or orifices between fourth stage orifices 136 and gas outlet 128. The additional stages may be included in series to increase the efficiency of multistage aspirator 120 and/or to dilute undesirable aspects of the primary gas supply. Each stage may include at least one orifice located downstream of the preceding stage orifice and extending from the external surface to the internal surface of multistage aspirator 120. In each subsequent stage, the internal diameter of multistage aspirator 120 may increase from the diameter of the preceding stage to a greater internal diameter.

Figure 4:
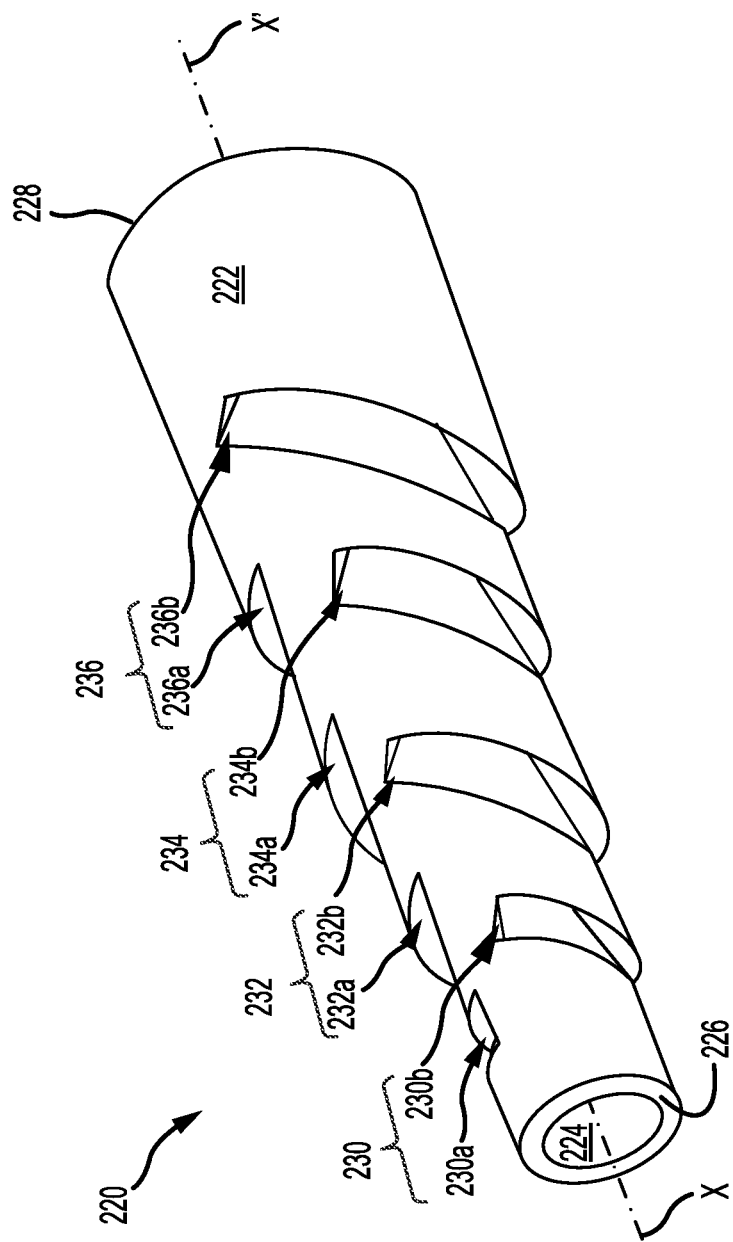
FIG. 4 illustrates a perspective view of a multistage aspirator having spiraled orifices, in accordance with various embodiments.

In various embodiments, with momentary reference to FIG. 4, a multistage aspirator 220 having one or more helically oriented orifices is illustrated. In accordance with various embodiments, multistage aspirator 220 includes an external surface 222 and an internal surface 224. Internal surface 224 is oriented generally toward a center axis X-X' of multistage aspirator 220. External surface 222 is oriented generally away from center axis X-X'. Multistage aspirator 220 may comprise a generally cylindrical shape, with external surface 222 and internal surface 224 oriented about center axis X-X'. Multistage aspirator 220 includes a first (or inlet) end defining a primary gas inlet 226, and a second (or outlet) end defining a gas outlet 228.

Multistage aspirator 220 includes two or more stages with each stage defining at least one orifice, such as for example, first stage orifice 230, second stage orifice 232, third stage orifice 234, and/or fourth stage orifice 236. Each of first stage orifice 230, second stage orifice 232, third stage orifice 234, and fourth stage orifice 236 is configured to entrain ambient air with gas flowing through multistage aspirator 220. In each subsequent stage, the internal diameter of multistage aspirator 220 may increase from the diameter of the preceding stage to a greater internal diameter, similar to the diameter increases in multistage aspirator 120 in FIG. 3B.

In various embodiments, first stage orifice 230, second stage orifice 232, third stage orifice 234, and/or fourth stage orifice 236 may be helically oriented about center axis X-X'. In this regard, a first portion of the orifice inlet may be circumferentially and axially offset from a second portion of the orifice inlet. As used herein, the "orifice inlet" refers to the area of the orifice proximate exterior surface 222 and/or where ambient air enters the orifice. For example, a first portion 230a of first stage orifice 230 is circumferentially offset from a second portion 230b of first stage orifice 230 and may be located closer to gas inlet 226, as compared to second portion 230b of first stage orifice 230. A first portion 232a of second stage orifice 232 is circumferentially offset from a second portion 232b of second stage orifice 232 and may be located closer to gas inlet 226, as compared to second portion 232b of second stage orifice 232. A first portion 234a of third stage orifice 234 is circumferentially offset from a second portion 234b of third stage orifice 234 and may be located closer to gas inlet 226, as compared to second portion 234b of third stage orifice 234. A first portion 236a of fourth stage orifice 236 is circumferentially offset from a second portion 236b of fourth stage orifice 234 and may be located closer to gas inlet 226, as compared to second portion 236b of fourth stage orifice 236. In various embodiments, helically orienting the orifices may cause one or more of the orifices to overlap in a circumferential direction. For example, first portion 236a of fourth stage orifice 236 may overlap second portion 234b of third stage orifice 234 in the circumferential direction. First portion 234a of third stage orifice 234 may overlap second portion 232b of second stage orifice 232 in the circumferential direction. First portion 232a of second stage orifice 232 may overlap second portion 230b of first stage orifice 230 in the circumferential direction. In various embodiments, first stage orifice 230, second stage orifice 232, third stage orifice 234, and/or fourth stage orifice may form a single, continuous orifice formed helically about center axis X-X'.

While multistage aspirator 220 is illustrated as having four stages of orifices, it is further contemplated and understood that multistage aspirator 220 may include any number of stages and/or orifices. For example, in various embodiments, multistage aspirator 220 may include fewer than four stages and in various embodiments, multistage aspirator 220 may include additional stages downstream of fourth stage orifice 236. In this regard, in various embodiments, multistage aspirator 220 may include additional stages and/or orifices between fourth stage orifice 236 and gas outlet 228. First stage orifice 230, second stage orifice 232, third stage orifice 234, fourth stage orifice 236, and any subsequent orifices are arranged such that the ambient air output from one orifice acts as the input flow of the downstream orifice. The multiple stages of orifices in multistage aspirator 220 tend to increase the efficiency of multistage aspirator 220 and/or to dilute undesirable aspects of the primary gas supply.

The orifices of multistage aspirator 220 are arranged or "spaced" such that a combined flow of gas and ambient air from each orifice may stabilize before reaching the ambient air output from the next orifice in the flow stream. In this regard, multistage aspirator 220 tends to draw in a greater volume of ambient air, as compared to single-stage aspirators. The increased amount of ambient air tends to increase inflation efficiency and may allow for smaller gas supplies, which tends to reduce a size and/or weight of the evacuation assembly. In various embodiments, each stage of multistage aspirator 220 feeds into the subsequent, or "downstream" stage, thereby compounding the ambient air intake. The increased ambient air volume may dilute undesirable gas products and/or decrease a temperature of the primary gas. Multistage aspirator 220 may thus allow for the evacuation assemblies that employ solid gas generators for gas supply, without the including additional gas cooling means, such as stored cryogenic coolers.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multistage aspirator for an inflatable assembly, comprising:
    a first end defining a primary gas inlet;
    a second end defining a gas outlet;
    an internal surface defining a flow path extending from the primary gas inlet to the gas outlet;
    an external surface opposite the internal surface;
    a first stage including a first internal diameter, the first internal diameter being measured along a first portion of the internal surface, wherein the first portion of the internal surface is located within the first stage and is parallel to a center axis of the multistage aspirator;
    a second stage downstream of the first stage and including a second internal diameter greater than the first internal diameter, the second internal diameter being measured along a second portion of the internal surface, wherein the second portion of the internal surface is located in the second stage and is parallel to the center axis of the multistage aspirator;
    a first stage orifice formed between the first stage and the second stage, the first stage orifice having a first inlet defined by the external surface and a first outlet defined by the internal surface, wherein a diameter of the internal surface as measured at an upstream edge of the first outlet is less than the first internal diameter; and
    a second stage orifice located downstream of the first stage orifice and extending from the external surface to the internal surface.

2. The multistage aspirator of claim 1, wherein the diameter of the internal surface as measured at a downstream edge of the first outlet is less than the second internal diameter.

3. The multistage aspirator of claim 2, wherein the second stage orifice includes a second inlet defined by the external surface and a second outlet defined by the internal surface, and wherein the diameter of the internal surface as measured at an upstream edge of the second outlet is less than the second internal diameter.

4. The multistage aspirator of claim 3, further including a third stage downstream of the second stage and including a third internal diameter greater than the second internal diameter and a third stage orifice located downstream of the second stage orifice, the third internal diameter being measured along a third portion of the internal surface, wherein the third portion of the internal surface is located in the third stage and is parallel to the center axis of the multistage aspirator.

5. The multistage aspirator of claim 4, wherein a diameter of the external surface in the third stage is greater than a diameter of the external surface in the second stage.

6. The multistage aspirator claim 4, further including a fourth stage downstream of the third stage and including a fourth internal diameter greater than the third internal diameter and a fourth stage orifice located downstream of the third stage orifice, the fourth internal diameter being measured along a fourth portion of the internal surface, wherein the fourth portion of the internal surface is located in the fourth stage and is parallel to the center axis of the multistage aspirator.

7. The multistage aspirator claim 4, wherein the diameter of the internal surface as measured at a downstream edge of the second outlet is less than the third internal diameter.

8. The multistage aspirator claim 7, wherein the diameter of the internal surface as measured at a upstream edge of a third outlet of the third stage orifice is less than the third internal diameter.

9. An evacuation assembly, comprising:
an inflatable;
a gas supply; and
a multistage aspirator fluidly coupled between the inflatable and the gas supply, the multistage aspirator including:
an internal surface defining a flow path through the multistage aspirator;
an external surface opposite the internal surface;
a first stage including a first internal diameter and a first stage orifice extending from the external surface to the internal surface; and
a second stage including a second internal diameter greater than the first internal diameter and a second stage orifice located downstream of first stage orifice and extending from the external surface to the internal surface, wherein a first portion of the external surface defines an upstream end of the second stage and radially overlaps a second portion of the external surface, the second portion of the external surface defining a downstream end of the first stage, wherein a first portion of the internal surface is parallel to a center axis of the multistage aspirator, the first portion of the internal surface being located in the first stage, and wherein a second portion of the internal surface located in the second stage is parallel to the center axis of the multistage aspirator, the first portion of the internal surface including the first internal diameter, and the second portion of the internal surface including the second internal diameter.

10. The evacuation assembly of claim 9, wherein the gas supply includes a solid gas generating material.

11. The evacuation assembly of claim 10, wherein the internal surface defines a first outlet of the first stage orifice, and wherein a diameter of the internal surface as measured at an upstream edge of the first outlet is less than the first internal diameter as measured in the first stage.

12. The evacuation assembly of claim 11, wherein the internal surface as measured at a downstream edge of the first outlet is less than the second internal diameter.

13. The evacuation assembly of claim 9, wherein the multistage aspirator further includes a third stage including a third internal diameter greater than the second internal diameter and a third stage orifice located downstream of the second stage orifice, the third stage orifice extending from the external surface to the internal surface.

14. The evacuation assembly of claim 13, wherein the multistage aspirator further includes a fourth stage including a fourth internal diameter greater than the third internal diameter and a fourth stage orifice located downstream of the third stage orifice, the fourth stage orifice extending from the external surface to the internal surface.

15. The evacuation assembly of claim 9, wherein a diameter of the external surface in the second stage is greater than a diameter of the external surface in the first stage.

16. An inflation system, comprising:
a gas supply comprising a solid gas generating material; and
a multistage aspirator fluidly coupled to the gas supply, the multistage aspirator including:
an internal surface defining a flow path between a primary gas inlet and a gas outlet of the multistage aspirator;
an external surface opposite the internal surface;
a first stage including a first internal diameter, the first internal diameter being measured along a first portion of the internal surface, wherein the first portion of the internal surface is located within the first stage and is parallel to a center axis of the multistage aspirator; and
a second stage downstream of the first stage and including a second internal diameter greater than the first internal diameter, the second internal diameter being measured along a second portion of the internal surface, wherein the second portion of the internal surface is located within the second stage and is parallel to the center axis of the multistage aspirator;
a first stage orifice formed between the first stage and the second stage, the first stage orifice having a first inlet defined by the external surface and a first outlet defined by the internal surface, wherein a diameter of the internal surface as measured at an upstream edge of the first outlet is less than the diameter of the internal surface as measured at a downstream edge of the first outlet; and
a second stage orifice located downstream of first stage orifice and extending from the external surface to the internal surface.

17. The inflation system of claim 16, wherein the multistage aspirator further includes:
a third stage downstream of the second stage including a third internal diameter greater than the second internal diameter, the third internal diameter being measured along a third portion of the internal surface;
a third stage orifice located downstream of the second stage orifice, the third stage orifice extending from the external surface to the internal surface;
a fourth stage including a fourth internal diameter greater than the third internal diameter, the fourth internal diameter being measured along a fourth portion of the internal surface; and
a fourth stage orifice located downstream of the third stage orifice, the fourth stage orifice extending from the external surface to the internal surface.

18. The inflation system of claim 17, wherein the second stage orifice includes a second inlet defined by the external surface and a second outlet defined by the internal surface, wherein a diameter of the internal surface as measured at an upstream edge of the second outlet is less than the diameter of the internal surface as measured at a downstream edge of the second outlet.

19. The inflation system of claim 16, further comprising a conduit fluidly coupling the gas supply to the multistage aspirator, the conduit including a choke.

* * * * *